R. E. BERING.
CASING CUTTER.
APPLICATION FILED APR. 7, 1920.
1,358,818.
Patented Nov. 16, 1920.
2 SHEETS—SHEET 1.
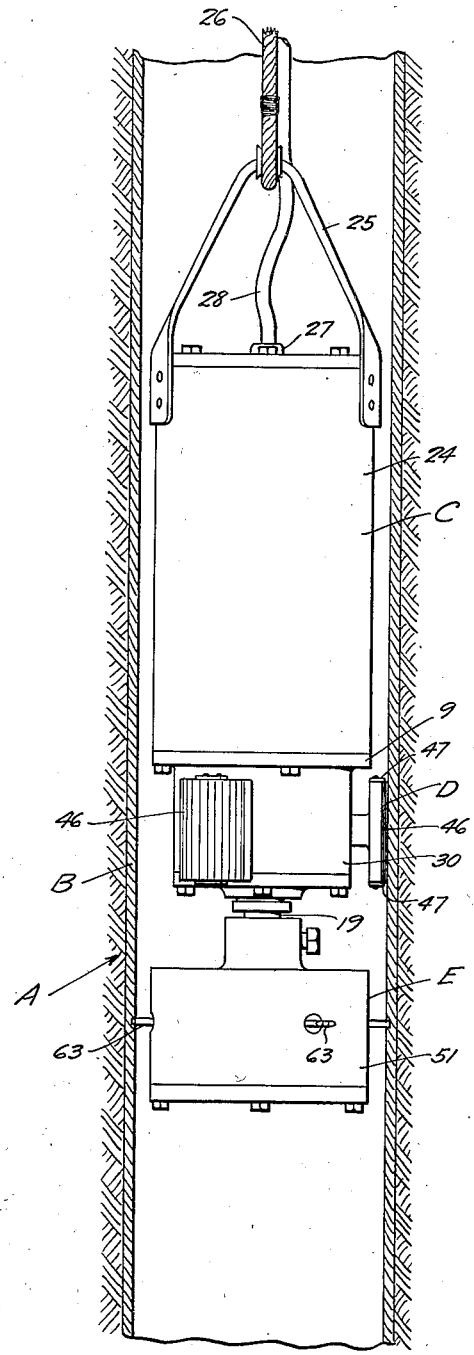
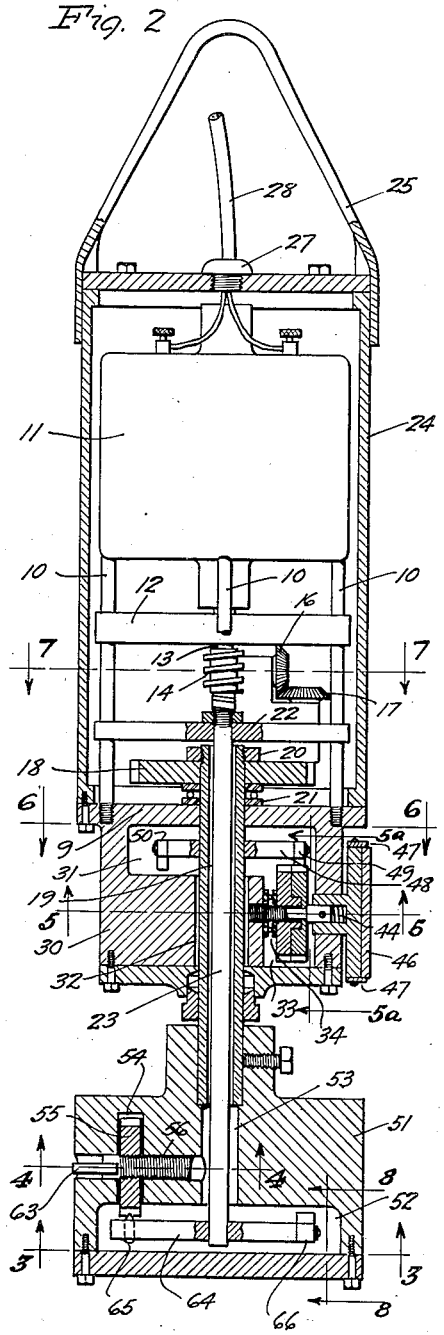
Inventor
Robert Ellis Bering
by Westall and Wallace
his Attorneys

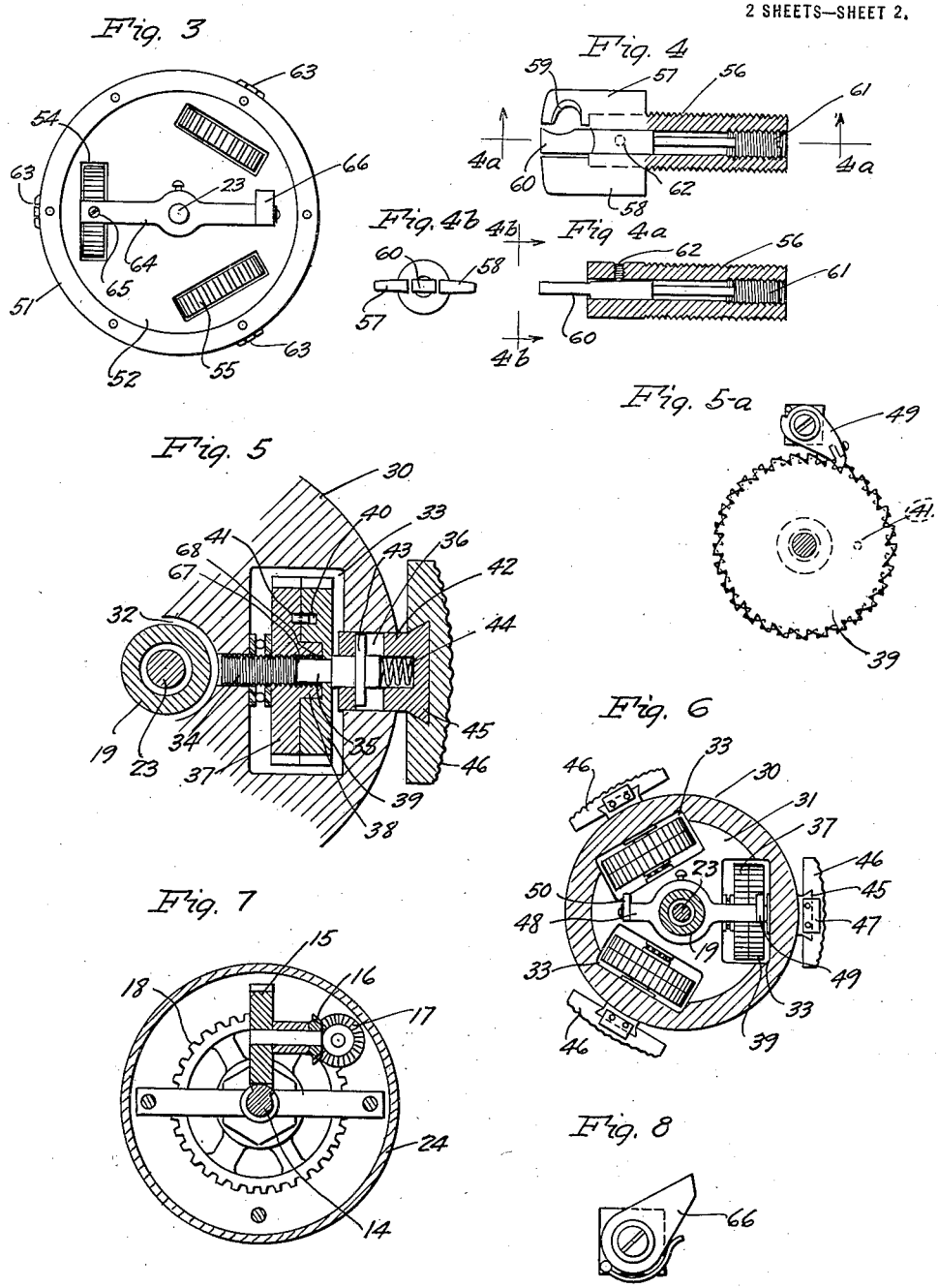

UNITED STATES PATENT OFFICE.

ROBERT ELLIS BERING, OF LOS ANGELES, CALIFORNIA.

CASING-CUTTER.

1,358,818.  Specification of Letters Patent.  Patented Nov. 16, 1920.

Application filed April 7, 1920. Serial No. 372,000.

*To all whom it may concern:*

Be it known that I, ROBERT ELLIS BERING, a citizen of the United States, residing at Los Angeles, in the county of Los Angeles and State of California, have invented new and useful Improvements in Casing-Cutters, of which the following is a specification.

This invention relates to means for cutting tubing, and pertains especially to an internal cutter.

When it is desired to remove casing from an oil well and the entire string cannot be pulled, it is the usual practice to employ an internal cutter, which is let down in the casing and turned from the surface. Much time and labor are required to place the cutter in position with the shaft for turning extending to the surface. The objects of my invention are first, to provide a cutter and motor therefor, which are self-contained and may be let down to the point at which the casing is to be cut and there operated, cable being sufficient to lower and raise the same and no operating shaft being required; second, to provide a mechanism which may be locked in the casing when in position to cut; and third, to provide mechanism of the character described which when it is started will automatically lock itself, then cut, and when reversed will withdraw the cutters and then unlock itself from the casing so that it may be raised.

I accomplish these objects by means of the embodiment of my invention illustrated in the accompanying drawing, and although the embodiment is that of a mechanism suitable for cutting well casing, yet the invention is not limited to such embodiment or use.

Referring to the drawings, Figure 1 is a section through a well with casing therein illustrating my improved cutter in elevation and locked in position in the casing; Fig. 2 is an enlarged elevation, partly in section of the cutter mechanism; Fig. 3 is a section taken on the line 3—3 of Fig. 2; Fig. 4 is an enlarged section of the cutter taken on the line 4—4 of Fig. 2; Fig. 4ᵃ is a section taken on the line 4ᵃ—4ᵃ of Fig. 4; Fig. 4ᵇ is an end elevation of the cutter as seen on the line 4ᵇ—4ᵇ of Fig. 4ᵃ; Fig. 5 is an enlarged fragmentary section taken on the line 5—5 of Fig. 2; Fig. 5ᵃ is an end elevation of the ratchet wheels as seen on the line 5ᵃ—5ᵃ of Fig. 2; Fig. 6 is a section taken on the line 6—6 of Fig. 2; Fig. 7 is a section taken on the line 7—7 of Fig. 2; and Fig. 8 is an enlarged end elevation of the pawl as seen on the line 8—8 of Fig. 2.

Referring more particularly to Fig. 1, a well hole is indicated by A, and B is the casing lining the same. Only a portion of the casing is shown, it being of a well known type. Disposed within the casing is the cutting mechanism comprising a motor and gearing indicated generally by C, a clamping structure indicated generally by D, and a cutting head indicated generally by E.

Referring more particularly to Fig. 2, a base plate 9 serves as a foundation for supporting the motor and gearing. Mounted upon the base plate are standards 10 supporting an electric motor 11 of any suitable type, preferably wound so that it may be reversed by reversing the current. A bearing bar 12 supported between the standards has the motor shaft journaled therein. Upon the shaft is a worm 14 meshing with a worm wheel 15, see Fig. 7. Worm wheel 15 is mounted upon a shaft carrying a bevel gear 16 meshing with a bevel gear 17. Bevel gear 17 is mounted upon a shaft carrying a pinion meshing with a spur gear 18. Spur gear 18 is fixed to a hollow shaft 19. The system of gearing just described is nothing more than a system for reducing the speed between the motor shaft and the shaft 19, and the specific gearing forms no part of my invention. The upper end of shaft 19 is threaded and provided with a nut 20. Interposed between the gear 18 and the base is a thrust bearing 21, so that the weight of the shaft 19 and the parts suspended thereon are carried by the base plate. A cross bar 22 extends between the standards 10, and fixed thereto against rotation is a rod 23. Inclosing the motor and gearing is a housing 24. Secured to the housing at the top thereof is a bail 25 serving as a means to attach cable 26, see Fig. 1, whereby the cutting mechanism may be raised and lowered. Extending through a fluid tight bushing 27 in the top of the casing is an electric cable 28, whereby electric current is supplied to the motor. The supporting cable 26 and the electric cable 28 extend to the surface of the well. Formed in a head 30 extending below the plate 9 is a chamber 31, and extending from the chamber to the lower face is an opening 32. Three chambers each indicated by 33 are formed to receive ratchet wheels for operating the clamp arms. As each of the chambers, sets of ratchet wheels and associated parts are the same, only one will be described. Extending radially of the head and across the central part of a chamber 33 is a shaft having a threaded end 34. The diameter is reduced intermediate the ends as indicated by 35, best shown in Fig. 5. The end of the shaft is of enlarged diameter as indicated by 36. Mounted upon the threaded portion of the shaft and engaged with the threads thereon is a ratchet wheel 37. Ratchet wheel 37 is formed with an extension 38. Mounted upon the shaft at the reduced portion 35 is a ratchet wheel 39. Ratchet wheel 39 is formed with a recess conforming to the collar 38 on wheel 37 so that the inner faces of gears 37 and 39 may be in contact. Formed in the inner face of gear 39 is a recess 40 to receive a pin 41 fixed to ratchet wheel 37. The pin 41 and recess 40 are so arranged that they may register, and when the wheels are in contact with one another they are locked to each other by the pin so that they will rotate together. Mounted upon the end 36 of the shaft is a block 42 which is squared externally and is slidably mounted in a square recess in the head. Elongated slots communicating with the bore of the block are formed therein so that a pin 43 fixed to shaft end 36 may slide therein. Mounted between the end of the shaft and the end of the recess in the block is a compression spring 44, so that the block is resiliently mounted upon the end of the shaft. The end of the block has flaring sides so that it forms a dove-tail 45 fitting in a mortise of a shoe 46. The fit between the dove-tail 45 and the shoe is such that the shoe may be removed without great effort. Overlying the dove-tail and shoe at the top is a plate 47. A similar plate is disposed on the bottom of the block. The plates are of such strength and so arranged that when considerable pressure is placed upon the shoe attempting to remove it from the block, the plate will bend permitting such removal. This forms a safety construction for a purpose later described. Referring particularly to Figs. 2 and 6, a bar 48 is shown secured to the hollow shaft 19, and is provided with a long and a short arm. The end of the long arm is so disposed that it overhangs the ratchet wheels 39, and upon the end thereof is a spring pressed pawl 49. A similar pawl 50 is disposed upon the end of the short arm, but is arranged to operate in the opposite direction. Pawl 50 will engage the teeth on ratchet wheels 37, the teeth being arranged in the opposite direction to the teeth on wheels 39. Rotation of shaft 19 will cause revolution of the arm 48. Normally both wheels will be moved together by reason of the pin 41 locking them. Assume that the arm 48 is rotating in a direction such that pawl 49 engages the teeth on wheels 39 and rotates the latter. This will cause the shaft 34 to be projected and finally the shoulder 67 on the shaft will engage the wheel 39. Further movement causes the wheel 39 to be moved longitudinally on the shaft until pin 41 is disengaged from the recess 40, and gears 37 and 39 are thus disengaged. Upon reversal of the motor, the bar 48 is revolved in the opposite direction, pawl 50 engaging the teeth on wheel 37, rotating the latter and retracting the shaft, the wheel 39 being moved axially of the shaft until pin 41 again engages the recess 40. It is obvious that when one pawl is operating a set of wheels, the other pawl merely moves over its set.

Secured to the end of the shaft 19 is a chuck 51. A chamber 52 is formed therein at the bottom, and a passage 53 serves for communication with the chamber. Extending through the passage 53 is the rod 23. Formed in the chuck are three chambers 54 to receive ratchet wheels 55. As these ratchet wheels and their coöperating parts are the same in construction, only one will be described. Extending radially through each chamber is a bore, in which is mounted a shank 56 of a cutting tool. The ratchet wheel is engaged by means of threads with the shaft. On the end of the shaft are wings 57 and 58 which serve as guides for the cutter. The forward side has a shaving recess 59. Shaft 56 has a bore extending axially thereof internally threaded at one end to receive an adjustment plug 61. The other end of the plug engages the cutter so that the latter may be projected and adjusted to make the proper cut. A set screw 62 serves to hold the cutter in position after it has been adjusted. It is obvious that the cutter may be made of suitable tool steel, and can be readily adjusted and removed for grinding and replacement. The cutters are indicated generally by 63 in Figs. 1, 2, and 3. Mounted upon the end of rod 23 is a bar 64. It carries a pin 65 which will engage the teeth on wheels 55 and turn them in either direction. On the opposite end of arm 64 is a pawl 66, which will move the gears only in one direction. The chuck 51 is rotated while the arm 64 remains stationary. The pawl 66 is so disposed that when the chuck is rotated to cut, it will not engage the teeth on the wheels to advance the cutters, but when the chuck is reversed to withdraw the cutters, pawl 66 operates and the wheels 55 are moved twice as fast. It is obvious that the wings 57 and 58 will prevent rotation of the shank 56 of the cutters. Thus, rotation of the wheel will cause the cutters to be projected or retracted depending upon the direction of rotation.

The mechanism is operated in the following manner: It is let down into the well by means of cable 26 to the point at which it is desired to cut the casing. When let into the well the clamping shoes 46 are in retracted position as are also the cutters. The motor is now started in a direction to cut the casing. This causes shaft 19 to revolve and the clamping shoes to be projected. The shoes finally engage the casing and the springs 44 compensate for any variations in the diameter of the casing. Finally ratchet wheels 39 are thrown out of engagement with wheels 37 and the shoes are not projected farther. At the same time the cutters are projected, the movement between the clamping shoes and the cutters being so adjusted that the former will take hold of the casing before the latter begin to cut. The chuck 51 is rotated and the cutters projected, this operation being continued until the casing is cut through. The motor is now reversed and the cutters will be retracted twice as fast as they were projected. At the same time the shafts 34 for the clamping means are withdrawn. When the pressure on springs 44 is entirely relieved, the shoes will be withdrawn from the wall of the casing, thereby releasing the mechanism. The mechanism may now be lifted and the string of cut casing pulled.

If for any reason the motor should fail to operate after the cutting mechanism has been locked in the well, a strong pull is exerted upon the cable 26. This will cause plates 47 to bend over and release the shoes. The mechanism may then be lifted to the top, while the shoes will drop to the bottom of the well.

I have disclosed a self contained cutting mechanism which may be lowered into the casing, automatically locked in position and the casing cut. A reversal of the current in the motor will withdraw the cutters and release the locking mechanism. The simplicity of manipulation of the mechanism and its installation and withdrawal from the well is obvious.

What I claim is:

1. A tool for tubes comprising a portable frame, a single motor mounted thereon, a clamping mechanism operated by said motor having clamp arms for advancement and engagement with said tube to lock said frame therein, means to automatically disconnect and arrest said clamp arms upon engagement with said tube, and means to operate on said tube actuated by said motor.

2. In a tube cutting mechanism, the combination of a portable frame, a single motor mounted thereon, a clamping mechanism operated by said motor having clamp arms for advancement to engage said tube and to lock said frame therein, means to automatically disconnect and arrest said clamp arms upon engagement with said tube, and cutting means comprising a rotatable chuck, cutters in said chuck for projection and retraction, and gearing connecting said motor and said cutters to operate the same.

3. In a tube cutting mechanism, the combination of a portable frame, a motor therein, a clamping mechanism operated by said motor to lock said frame in the tube, and cutting means comprising a chuck rotated by said motor, cutters having threaded shafts for projection and retraction, toothed wheels mounted on said threaded shafts, and a pawl mechanism for rotating said wheels in both directions.

4. In a tube cutting machine, the combination of a portable frame, a motor thereon, a clamping mechanism operated by said motor to lock said frame in the tube, cutting means comprising a chuck rotated by said motor, cutter holders having threaded shanks, toothed wheels on said shanks, and a stationary tooth for engagement with said wheels to advance and retract said holders.

5. A clamping mechanism comprising a head, clamping arms mounted therein to be projected and retracted therefrom, said arms being provided with threaded shafts, ratchet wheels for retracting said arms mounted on said shafts, ratchet wheels for advancing said arms mounted on said shafts, means for clutching said retracting and advancing wheels together, means to disengage said wheels when said arms are advanced, and pawl means arranged to engage the advancing wheels on rotation in one direction and the retracting wheels on rotation in the other direction.

In witness that I claim the foregoing I have hereunto subscribed my name this 30th day of March, 1920.

ROBERT ELLIS BERING.